L. B. LITTLEJOHN.
FOUR WHEEL DRIVE MECHANISM.
APPLICATION FILED JUNE 6, 1917.
1,295,335.
Patented Feb. 25, 1919.
2 SHEETS—SHEET 2.
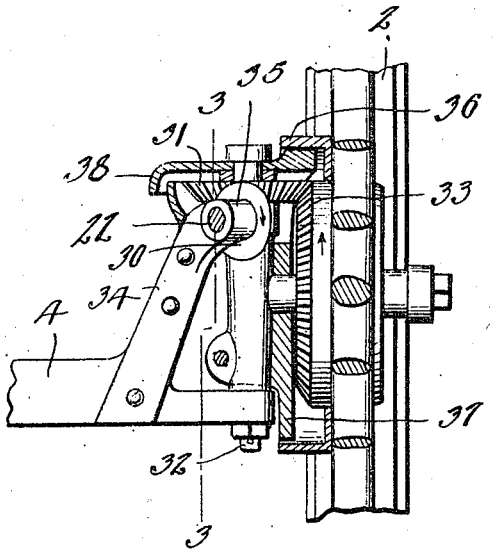
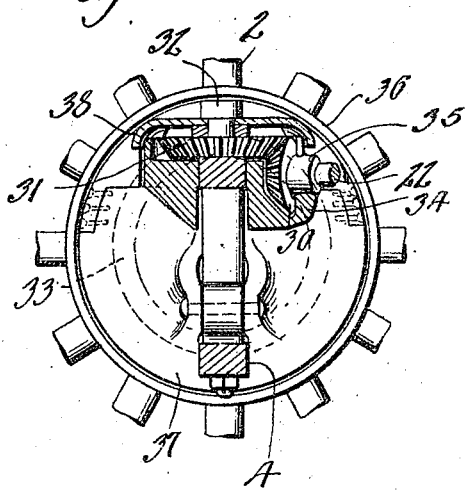
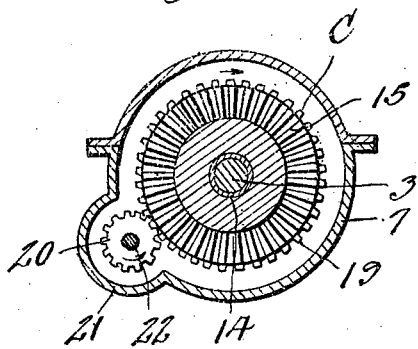
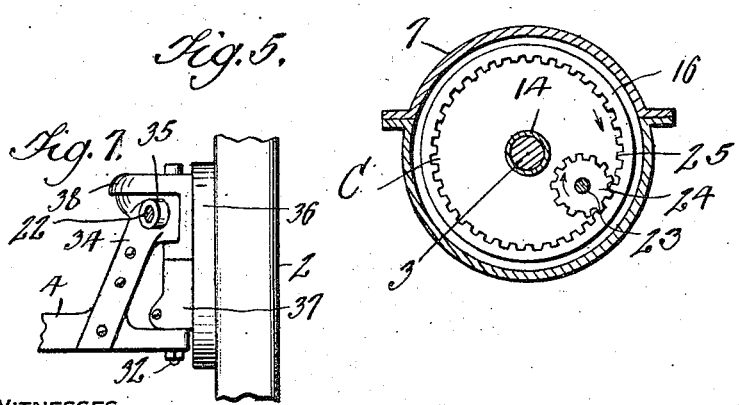
WITNESSES
INVENTOR
L. B. Littlejohn,
BY Victor J. Evans.
ATTORNEY

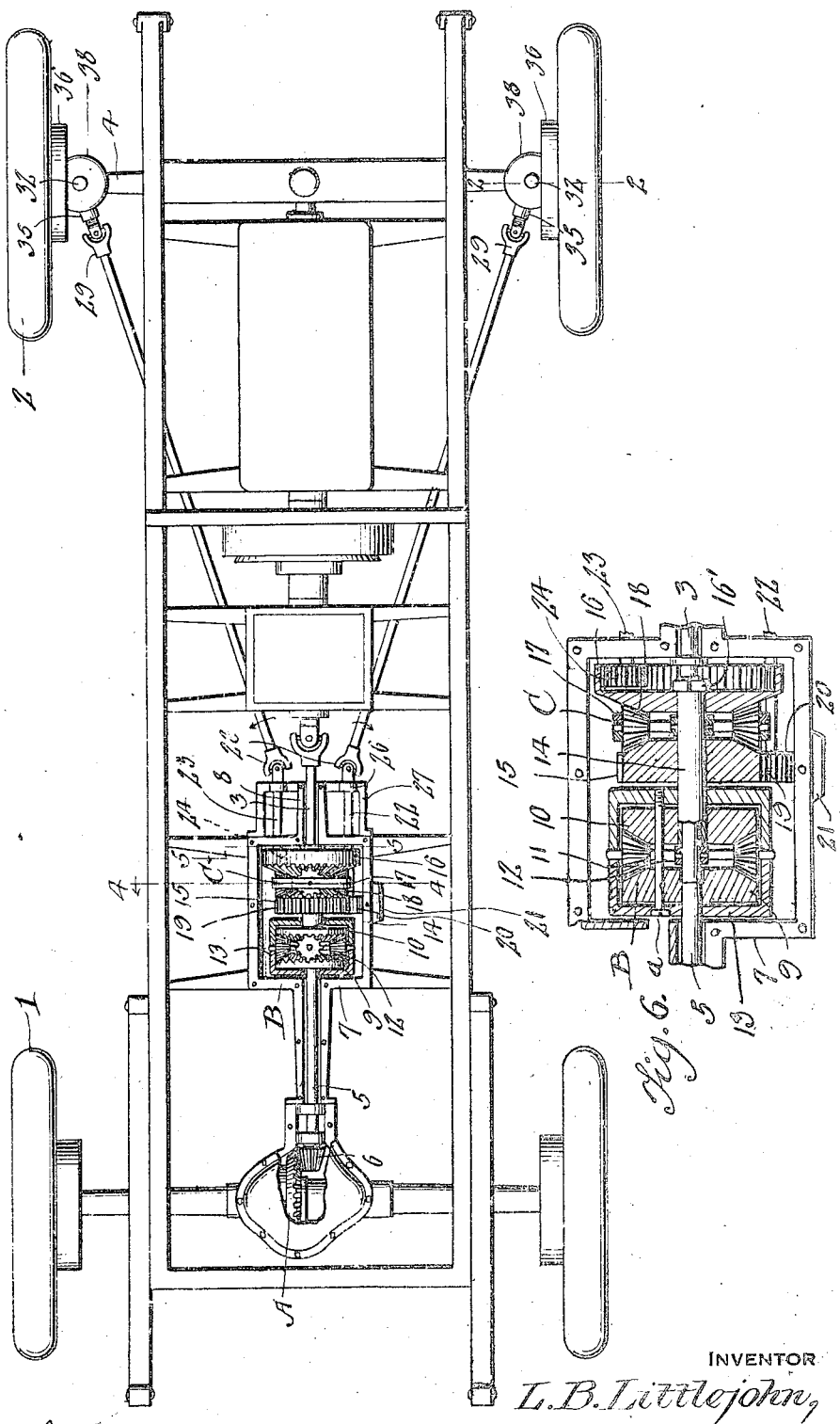

UNITED STATES PATENT OFFICE.

LONZO B. LITTLEJOHN, OF WORTHAM, TEXAS.

FOUR-WHEEL DRIVE MECHANISM.

1,295,335.  Specification of Letters Patent.  Patented Feb. 25, 1919.

Application filed June 6, 1917. Serial No. 173,180.

*To all whom it may concern:*

Be it known that I, LONZO B. LITTLEJOHN, a citizen of the United States, residing at Wortham, in the county of Freestone and State of Texas, have invented new and useful Improvements in Four-Wheel Drive Mechanism, of which the following is a specification.

This invention relates to four wheel drive mechanism, the object in view being to provide mechanism for transmitting the power of the engine of a motor vehicle to all four of the carrying wheels thereof, at the same time equalizing the power applied to each of the wheels by means of a novel arrangement of differential gearing and the connection thereof with the carrying wheels, each of which is thus adapted to be positively driven irrespective of the particular speed thereof in relation to the speed of the other wheels.

As a result of the driving gearing hereinafter particularly described, there is an equal pull derived from all of the wheels whether the vehicle is traveling on a straightaway course or on a curvilinear course, better traction is obtained in traveling over soft roads and in climbing steep grades, and the tendency of the vehicle to skid on slippery road beds is materially reduced.

With the above and other objects in view, the invention consists in the novel construction, combination and arrangement of parts, herein described, illustrated and claimed.

In the accompanying drawings:

Figure 1 is a plan view partly in section illustrating the four wheel driving mechanism in its applied relation to the chassis of a motor vehicle; and Fig. 2 is an enlarged fragmentary section on the line 2—2 of Fig. 1.

Fig. 3 is a section on the line 3—3 of Fig. 2.

Fig. 4 is a section on the line 4—4 of Fig. 1.

Fig. 5 is a section on the line 5—5 of Fig. 1.

Fig. 6 is an enlarged fragmentary section through the adjacent differential gearings.

Fig. 7 is a fragmentary elevation adjacent to one of the steering knuckles.

Referring to the drawings 1 designates the rear carrying wheels of the vehicle and 2 the front or steering wheels. The rear wheels are mounted upon the usual sectional or divided axle and are connected through the rear differential gearing A to the main driving shaft 3 which is connected to the engine shaft and driven thereby in the ordinary way well understood by those familiar with the art to which this invention appertains. The front axle 4 is of the usual stationary and rigid type, the steering wheels 2 being mounted at the ends of the axle 4 and capable of being turned in angular relation thereto in accordance with the present practice.

In carrying out the present invention, the driving shaft 3 is divided between the ends thereof, embodying in connection with the main section, an extension 5 located in rear of the main section 3 and in longitudinal alinement therewith and having fast thereon the usual pinion 6 which meshes with the master gear or ring gear of the rear differential gearing A. Located in advance of the differential gearing A is another differential gearing B and located in advance of the gearing B is a third differential gearing C, the gearings B and C being inclosed in an oil-tight housing 7 the forward end of which is reduced to form a comparatively small tubular extension 8 which forms a housing for the adjacent portion of the main driving shaft 3.

The gears comprising the differential gearing B, consist of a gear 9 which is fastened to the rear section 5 of the main driving shaft 3. In advance of the gear 9 is another gear 10 and between the gears is a spider 11 fastened to the shaft 3 and carrying pinions 12 in constant mesh with the gears 9 and 10 in accordance with the ordinary differential gearing now in common use. A housing or carrier 13 extends around the gears 9, 10 and 12 and serves to hold the same in proper working relation to each other.

The gear 10 is fast on a tubular shaft 14 which extends through the rearmost gear 15 of the differential gearing C and receives the main section 3 of the driving shaft. In front of the gear 15 is another gear 16 held in place by a lock nut 16' and between the gears 15 and 16 is a spider 17 fastened to the shaft 14 and carrying pinions 18 in constant mesh with the gears 15 and 16 in accordance with the ordinary differential gearing now in common use. The gear 15 is formed with a spur gear face 19 meshing with and driving a laterally disposed gear or pinion 20 contained in an extension 21 of the housing 7. The gear 20 is fast on a forwardly extending front wheel driving shaft 22 arranged at one side of the main driving shaft 3. Another front wheel driving shaft 23 is arranged at the opposite side of the shaft 3 and has fast on the rear end thereof a gear or pinion 24 which meshes with an internal gear face 25 forming a part of the gear 16, the gear 24 being contained within the main housing 7. Bearings for the shafts 22 and 23 are provided in the housing extension 21 and the main housing 7 and other bearings 26 for said shafts 22 and 23 are supported by the opposite ends of a transversely extending yoke or bar 27 fastened by any suitable means to the housing extension 8 hereinabove referred to.

The front wheel driving shafts 22 and 23 are of the tumbling type, each of said shafts having universal or tumbling joints 28 and 29. The forward sections of said tumbling shafts diverge toward the front axle and on the forward extremity of each of said tumbling shafts there is fastened a bevel gear 30 which meshes with another bevel gear 31, the latter being journaled on a substantially vertical pivot shaft 32, forming the pivotal connection between the adjacent end of the front axle 4 and the adjacent front steering wheel 2. The gear 31 meshes with a ring gear 33 fastened to the inner face of the wheel 2 and in that way driving power is transmitted to said front steering wheel. A knuckle joint is thus formed between each steering wheel and the adjacent end of the front axle and that part of the knuckle joint which is carried by the axle comprises an upstanding bearing member 34 formed with a bearing 35 for the forward end portion of the adjacent tumbling shaft 22 or 23 as the case may be. The wheel 2 is provided with an annular flange or mud guard 36 which extends over another annular flange or mud guard 37 pivotally mounted in relation to the adjacent end of the axle and adapted to swing back and forth in accordance with the steering movement of the adjacent gearing wheel 2. A mud guard or cap 38 extends from the top of the bearing member 34 over the gear 31 to protect the latter and also the bearings located beneath the same for the pivot shaft 32.

From the foregoing description taken in connection with the accompanying drawings it will now be understood that the power transmitted by the engine to the driving shaft 3 is equalized upon the rear wheels 1 by the ordinary rear differential gearing and rear axle, therefore the rear wheels 1 operate in the usual way. The differential gearing B provides for a different ratio of speed between the rear driving axle and the differential gearing C which controls and equalizes the power transmitted to the front wheel driving shafts 22 and 23. By means of the differential gearing C, allowance is made for a different ratio of speed between the front wheel driving shafts 22 and 23 thus permitting one of the front wheels to turn faster than the other as in making a turn, while at the same time effecting a continuous application or transmission of power to both of said front wheels. In making a turn with a motor vehicle, almost invariably all four of the wheels are turning at different speeds. The mechanism herein described and shown compensates for such differential speed of the carrying wheels of the vehicle and also insures a constant application and distribution of the power transmitted thereto. As a result the hill climbing ability of the vehicle is materially increased as well as its ability to negotiate soft road surfaces and in view of the fact that all of the wheels are driven, there is a materially reduced tendency of the vehicle to skid.

It is of course to be understood that antifriction bearings will be used at all necessary points to relieve friction and that suitable means are to be provided for lubricating all of the gears, shafts, bearings and joints. The vehicle will also steer with greater ease than the motor vehicles now in common use on account of the fact that the front wheels are drivers as well as the rear wheels.

In case the differential gearing B should get out of order or become inoperative for any reason, the pinion 6 will be removed from the shaft 5 and an emergency pin $a$ will be inserted through the end walls 13 of the differential carrier, also through the gears 9 and 10. The pin $a$ serves to lock all of the gears of the differential gearing B and this enables the differential gearing C to operate properly. In case the differential gearing C should get out of order or become inoperative for any reason, the pinions 18 are removed and then the shaft 3 operates through the differential gearing B to transmit motion to the shaft 5 and through the differential gearing A to the rear wheels. It may be explained that the tubular shaft 14 extends through the gear 16 and the nut 16' is threaded on said shaft and bears against the gear 16. The spider 17 is surrounded by a circular band as shown in Fig. 6, which band holds the pinions 18 in place on the spider.

I claim:—

1. In four wheel drive mechanism, a rear driving axle, driving wheels thereon, differential gearing associated with the sections of said rear axle, a main driving shaft divided into a front section and a rear section, the rear section being in driving connection with the rear differential gearing and the front section being in driving connection with the engine shaft, differential gearing located in advance of the rear differential gearing and controlling the rear section of the main driving shaft and driven by the engine shaft, a third differential gearing located in advance of the second differential gearing and actuated by the latter, and front wheel driving shafts geared to members of said third differential gearing and actuated thereby to admit of a variation in the ratio of speed between said front wheel driving shafts, and gearing connecting said front wheel driving shafts with the respective front wheels, said third differential gearing embodying a member having an externally toothed face meshing with a gear on one of said front wheel driving shafts, and also comprising another member having an internal gear face meshing with a gear on the other front wheel driving shaft.

2. In four wheel drive mechanism, the combination of a rear axle, a driving shaft divided between its ends into front and rear sections, differential gearing connecting the rear section of said driving shaft with the sections of the rear axle, front wheel driving shafts arranged at opposite sides of the main driving shaft, differential gearing interposed between the first named differential gearing and said front wheel driving shafts to admit of variation in the ratio of speed between the rear section of the main driving shaft and both of the front wheel driving shafts, a front axle, front carrying wheels, gears on said front wheels, steering knuckles between said front axle and the front carrying wheels, gears on the forward ends of said front wheel driving shafts, and other gears interposed between and meshing with the gears on the front wheels and the gears on the front wheel driving shafts.

In testimony whereof I affix my signature.

LONZO B. LITTLEJOHN.